US007644374B2

(12) United States Patent
Wong et al.

(10) Patent No.: US 7,644,374 B2
(45) Date of Patent: Jan. 5, 2010

(54) COMPUTER INPUT CONTROL FOR SPECIFYING SCOPE WITH EXPLICIT EXCLUSIONS

(75) Inventors: Lyon King-Fook Wong, Issaquah, WA (US); Stephan Hoefnagels, Seattle, WA (US); Timothy P. McKee, Seattle, WA (US); Chris J. Guzak, Kirkland, WA (US); David G. De Vorchik, Seattle, WA (US); Benjamin A. Betz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 11/105,479

(22) Filed: Apr. 14, 2005

(65) Prior Publication Data

US 2006/0235817 A1    Oct. 19, 2006

(51) Int. Cl.
*G06F 3/048* (2006.01)
(52) U.S. Cl. .................. 715/853; 715/202; 715/210; 715/713; 715/810; 715/854
(58) Field of Classification Search ................ 715/514, 715/853, 202, 210
See application file for complete search history.

(56) References Cited

U.S. PATENT DOCUMENTS

| 5,065,347 | A |   | 11/1991 | Pajak et al. |
| 5,230,072 | A | * | 7/1993 | Smith et al. .................... 707/4 |
| 5,668,966 | A |   | 9/1997 | Ono et al. |
| 5,923,328 | A | * | 7/1999 | Griesmer .................... 715/854 |
| 6,205,453 | B1 | * | 3/2001 | Tucker et al. ............... 715/503 |
| 6,239,803 | B1 | * | 5/2001 | Driskell ..................... 715/810 |
| 6,363,377 | B1 |   | 3/2002 | Kravets et al. |
| 6,407,761 | B1 | * | 6/2002 | Ching et al. ................. 715/835 |
| 6,437,812 | B1 | * | 8/2002 | Giles et al. .................. 715/853 |
| 6,449,744 | B1 | * | 9/2002 | Hansen ....................... 714/738 |
| 6,662,177 | B1 |   | 12/2003 | Martino et al. |
| 6,744,450 | B1 | * | 6/2004 | Zimniewicz et al. ........ 715/841 |
| 6,774,911 | B2 | * | 8/2004 | Hodgson et al. ............ 345/619 |

(Continued)

OTHER PUBLICATIONS

1st TurbobRun—Get to any program, document or bookmark in secondal, printed from http://www.turborun.com on Mar. 25, 2005.

(Continued)

*Primary Examiner*—Tadesse Hailu
*Assistant Examiner*—Alvin H Tan
(74) *Attorney, Agent, or Firm*—Shook, Hardy & Bacon L.L.P.

(57) ABSTRACT

Methods and systems providing a user interface control allowing a user to specify a scope of items on a computer system or network is disclosed. Certain aspects provide an input control through which a user can specify an explicit scope, or range, of items, while also identifying explicit exclusions from the specified scope, thereby reducing ambiguity regarding identification of items included and items excluded from the scope. When a user explicitly selects an item for inclusion in the scope, the explicitly selected item is added to the scope definition, and all descendants of the explicitly selected item are implicitly selected for inclusion. When a user explicitly selects an item for exclusion from the scope, the explicitly selected item is added to the scope definition as an exclusion from an explicitly included item, and all descendants of the explicitly selected item are implicitly selected for exclusion.

18 Claims, 9 Drawing Sheets

U.S. PATENT DOCUMENTS

| | | | |
|---|---|---|---|
| 6,966,033 B1 * | 11/2005 | Gasser et al. | 715/738 |
| 7,188,317 B1 * | 3/2007 | Hazel | 715/804 |
| 7,353,464 B1 * | 4/2008 | Kundu et al. | 715/853 |
| 2002/0057269 A1 * | 5/2002 | Barber et al. | 345/418 |
| 2003/0217052 A1 | 11/2003 | Rubenczyk et al. | |
| 2004/0236446 A1 * | 11/2004 | Sato et al. | 700/97 |
| 2005/0004911 A1 | 1/2005 | Goldberg et al. | |
| 2005/0132304 A1 * | 6/2005 | Guido et al. | 715/853 |
| 2006/0218533 A1 * | 9/2006 | Koduru et al. | 717/124 |

OTHER PUBLICATIONS

AdventNet "5.43 Parsing MIBs" Jan. 4, 2005, AdventNet Inc., http://web.archive.org/web/20050104714716/http://www.adventnet.com/products/agenttester/help/mib_browser/mib_operations/mb_parsing_mibs.html.

* cited by examiner

COMPUTER INPUT CONTROL FOR SPECIFYING SCOPE WITH EXPLICIT EXCLUSIONS

FIELD OF THE INVENTION

The invention relates generally to computers. More specifically, the invention provides an input control through which a user can specify a scope, or range, of items, while also identifying exclusions from the specified scope, thereby reducing ambiguity regarding identification of items included in and items excluded from the scope.

BACKGROUND OF THE INVENTION

When a user installs software on a computer, the user is often given a choice regarding which items or features of the software should be installed. An input control through which the user can make his or her selections is known as a tri-state input control, as illustrated in FIG. 2A-2D. In FIG. 2A, a user is presented with a window 201 through which the user can select which features of the software application Microsoft® Office® XP Professional the user desires to install. Upon selection of each drop down box, e.g., drop down box 203, the user is presented with a selection submenu 204. Using submenu 204, the user can select whether to install just that feature (by selection of 'Run from My Computer'), to install that feature and all included subfeatures (by selection of 'Run all from My Computer'), to install the feature when a user first tries to use it (by selection of 'Installed on First Use'), or to not install the feature or any subfeatures (by selection of 'Not Available').

Tri-state selection refers to each folder being able to have one of three states. In a first state, Full Selection, a folder and all its subfolders are selected, in which case the folder might be colored white as in FIG. 2A. In a second state, Partial Selection, at least one subfolder of a folder is selected, and at least one subfolder of the folder is not selected, in which case the folder might be colored gray (see FIG. 2B-2D). In the third state, No Selection, neither the folder nor any subfolders are selected, in which case the folder might be marked out, as illustrated by folders having the mark 'X' in FIGS. 2C and 2D.

Problematic issue arises regarding the second state described above. A first issue is that a user may be unable to determine which subfolders or subfeatures will be installed unless the user fully expands the hierarchical display to view what will be installed. A second issue is that the user may be unable to determine whether items stored in the hierarchically top folder are to be installed. The first issue is illustrated in FIG. 2B, where the topics 'Microsoft Office' and 'Microsoft PowerPoint for Windows' are grayed out, indicating that at least one hierarchically lower item is to be installed, and at least one hierarchically lower item is not to be installed. However, without expanding the hierarchical display of Microsoft PowerPoint for Windows, the user does not know which items are to be installed and which items are not to be installed.

Upon selection of the '+' widget next to box 203, the user is presented with FIG. 2C. While in FIG. 2C the user can conclusively determine that Help, Content Templates, and Presentation Broadcasting will be installed, and that Design Templates, Animation Sound Effects, and Pack and Go Wizard will not be installed, the user still cannot determine which items under the 'Presentation Translators' feature will be installed. Upon selection of the '+' widget next to box 207, the user is presented with FIG. 2D. Finally, in FIG. 2D, after drilling down two additional levels into the hierarchy, the user can conclusively determine that Harvard Graphics 3.0 for DOS will be installed, and Lotus Freelance 1.0-2.1 for Windows will not be installed. Thus, it is tedious for a user to perform additional steps simply to determine which items are included in the installation scope.

The second issue mentioned above is illustrated with respect to FIG. 3. FIG. 3 illustrates a search scope selection control, wherein the user can identify the scope of folders in which a search should be conducted. In this example, scope refers to the set of storage locations (e.g., folders) in which the search is conducted. For example, a user may want to search all his or her files, but exclude the Recycle Bin because he or she does not want deleted items to appear in the search results. A problem today is that there is no efficient way for users to specify what locations to exclude from a scope. Products such as Kazaa, Google's Picassa, and Adobe Album need to define scopes, and each has been trying, though unsuccessfully, to come up with a solution to this problem.

Specifically, a problem with known tri-state selection tree models is that when a sub-node within the tree is selected, an ambiguous state is reflected in that node's parent and all subsequent parent nodes. For the user looking at these parent nodes, there is no way to tell whether or not the parent nodes' locations are included in the search.

FIG. 3 illustrates a control exhibiting prior art behavior. In FIG. 3, a check mark next to a folder indicates that the specific folder, as well as all subfolders, will be included in the search scope. A blank box next to a folder indicates that the specific folder, as well as all subfolders, are not included in the search scope. A square mark within the square box indicates that at least one subfolder will be included in the search scope, and at least one subfolder will not be included in the search scope. As with the first issue illustrated with respect to FIGS. 2A-2D, FIG. 3 also presents the same ambiguity where a user cannot determine which folders and subfolders will or will not be included without expanding the hierarchy. For example, in the scope control view of FIG. 3, a user does not know which folders and subfolders of the 'Network Places' folder, if any, will or will not be included in the search scope.

The second issue, i.e., the user may be unable to determine whether items stored in the hierarchically top folder are to be installed, also occurs with respect to the view presented in FIG. 3. For example, in FIG. 3, below the Files folder, the user has selected the subfolders Documents, Pictures, and Music for inclusion in the search scope, and has excluded the subfolders Video, Contacts, Desktop, Favorites, and New Folder from the search scope. However, in FIG. 3 it is unclear whether the items stored in the Files folder itself, as opposed to items stored in subfolders of Files, are included within the search scope. That is, even if the user fully expands the hierarchy, the use still cannot determine whether the items stored in the Files folder will be included in the search scope.

Thus, it would be an advancement in the art to provide a scope selection input control that explicitly identifies items in a user-defined scope, without ambiguity, and without requiring a user to take extra steps, e.g., fully expanding a hierarchy, to determine which items in the hierarchy are included in the user-defined scope. It would be a further advancement in the art to be able to selectively exclude items from a user-defined scope.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to a method of specifying a scope of items on a computer system or network via a graphical user interface dual-component control by displaying a first component including a tree-like display of a plurality of hierarchically arranged items, where each item can be explicitly selected by a user for inclusion and/or exclusion from the scope. The GUI also displays a second component including a basket, or list, identifying the items explicitly included in and/or explicitly excluded from the scope. When the user explicitly selects a specific item, the control changes a state of the specific item from a previous state to a new state, and changes a state of each descendant of the specific item to a new implicit state based on the new state of the specific item.

In an illustrative embodiment, a state of each item of the plurality of hierarchically arranged items may indicate any of an unselected state, an explicitly included state, an implicitly included state, an explicitly excluded state, and an implicitly excluded state. The list of items may identify an explicitly included item corresponding to each explicitly excluded item.

According to an aspect of the invention, one or more computer readable media store computer executable instructions which, when executed, cause a computer system to provide on a video display a graphical user interface control for specifying a user-defined scope. The GUI control exhibits certain behavior, including displaying a plurality of hierarchically arranged items, e.g., in an expandable/collapsible tree-like manner, where each item of the plurality of hierarchically arranged items can be explicitly selected by a user for inclusion and/or exclusion from the scope. When the user explicitly selects an item for inclusion in or exclusion from the scope, the control implicitly selects all descendants of the explicitly selected item for inclusion in or exclusion from the scope, respectively. The control also displays, separately from the plurality of hierarchically arranged items, a first list of items explicitly included in the scope and a second list of items explicitly excluded from the scope, where each item in the second list corresponds to an item in the first list.

According to another aspect of the invention, when the user explicitly selects an unselected or implicitly excluded item, the control changes a state of the explicitly selected item to be explicitly included in the scope, and changes a state of each descendant of the explicitly selected item to be implicitly included in the scope. When the user explicitly selects an implicitly included item, the control changes the state of the explicitly selected item to be explicitly excluded from the scope, and changes the state of each descendant of the explicitly selected item to be implicitly excluded from the scope.

In some illustrative embodiments, the control may present a first inclusion indicator corresponding to each displayed explicitly included item, a second inclusion indicator, less prominent than each first inclusion indicator, corresponding to each displayed implicitly included item, and an exclusion indicator corresponding to each displayed explicitly excluded item.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Illustrative Operating Environment

Figure 1:
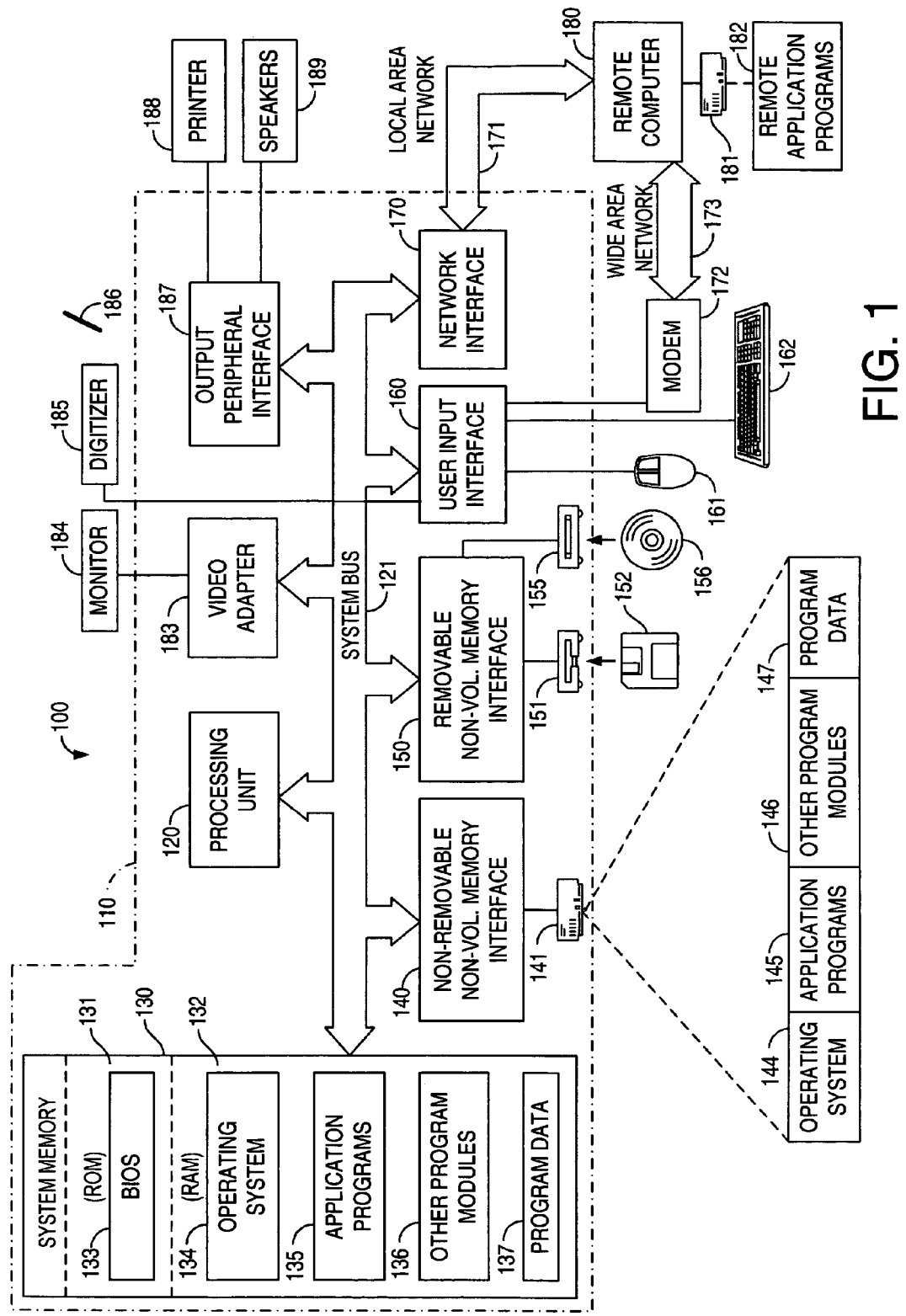
FIG. 1 illustrates an operating environment in which one or more illustrative aspects of the invention may be performed.
Figure 2A:
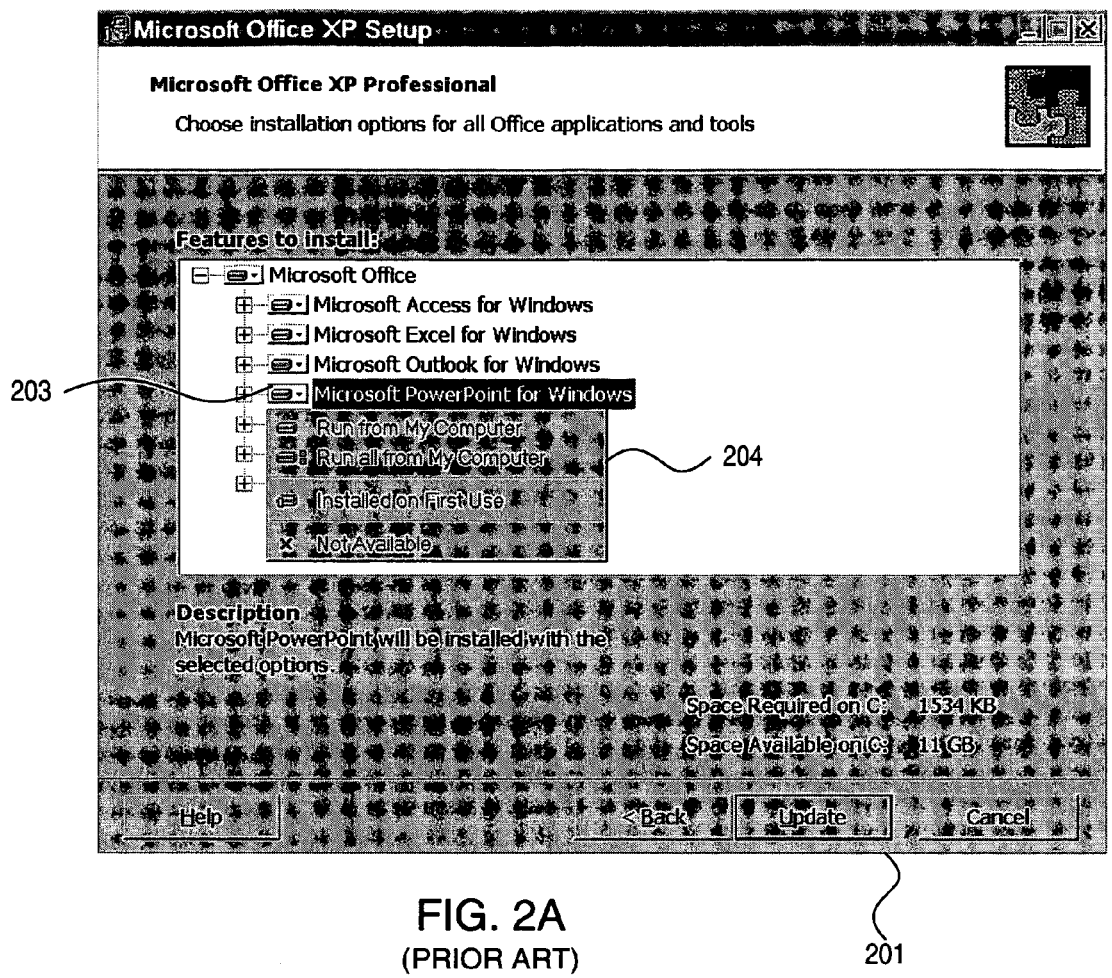
FIG. 2A illustrates a prior art screenshot of a tri-state selection control.
Figure 2B:
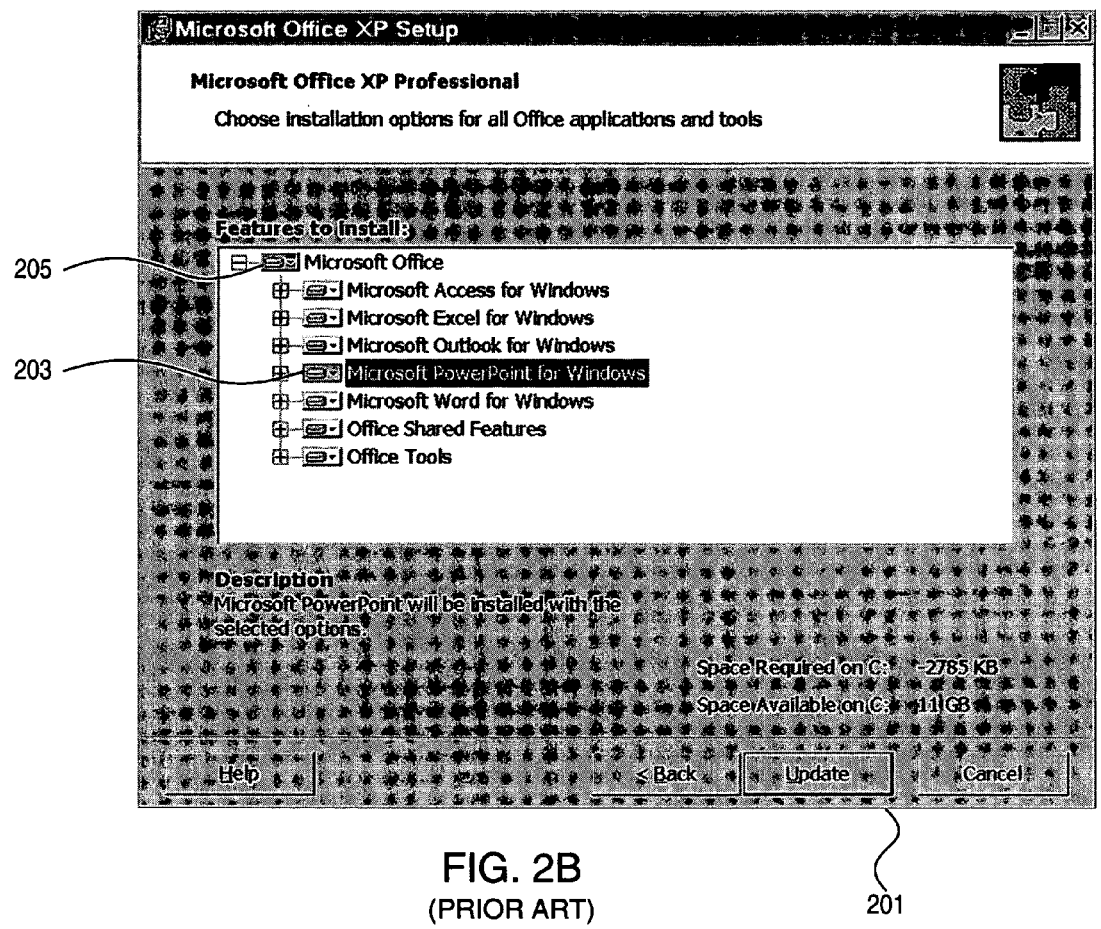
FIG. 2B illustrates another prior art screenshot of a tri-state selection control.
Figure 2C:
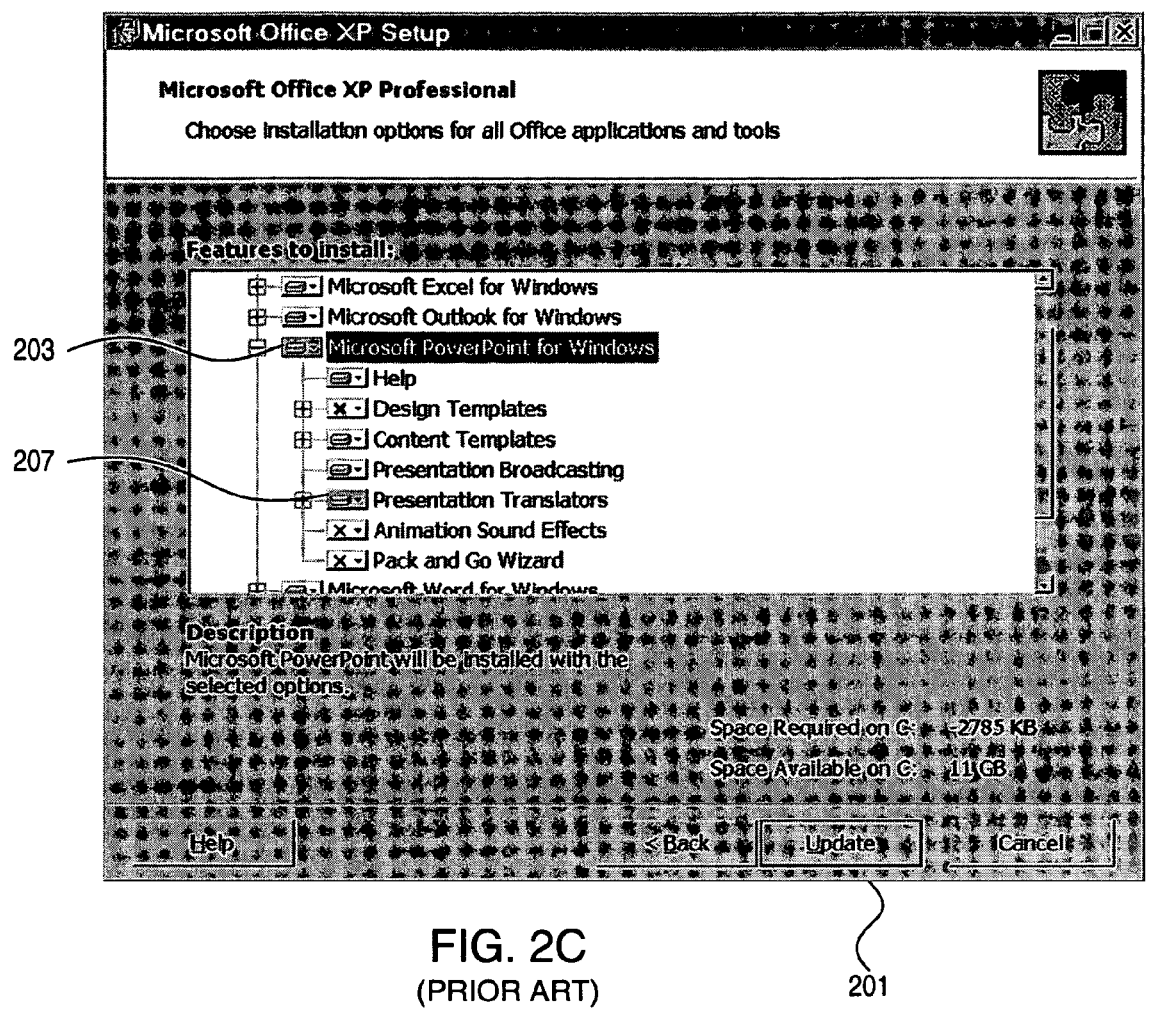
FIG. 2C illustrates another prior art screenshot of a tri-state selection control.
Figure 2D:
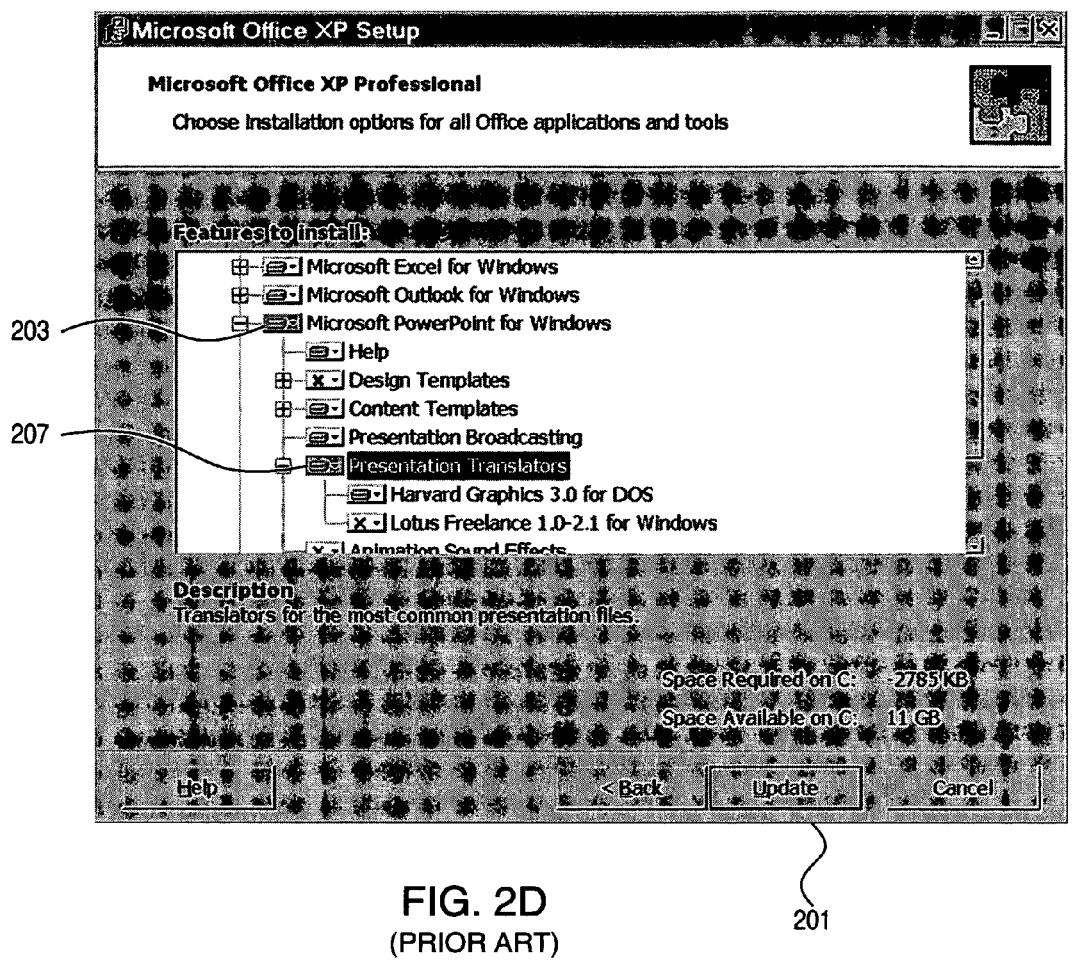
FIG. 2D illustrates another prior art screenshot of a tri-state selection control.
Figure 3:
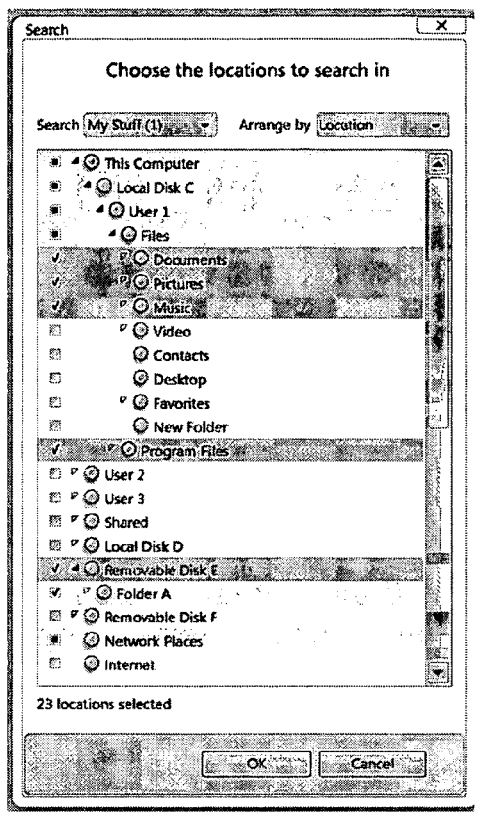
FIG. 3 illustrates an ambiguous tri-state selection control.

FIG. 1 illustrates an example of a suitable computing environment 100 in which the invention may be implemented. The computing environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers; server computers; portable and hand-held devices such as personal digital assistants (PDAs), tablet PCs or laptop PCs; multiprocessor systems; microprocessor-based systems; set top boxes; programmable consumer electronics; network PCs; minicomputers; mainframe computers; game consoles; distributed computing environments that include any of the above systems or devices; and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an illustrative system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, DVD, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port, universal serial bus (USB), or IEEE 1394 serial bus (FireWire). At least one monitor 184 or other type of display device may also be connected to the system bus 121 via an interface, such as a video adapter 183. The video adapter 183 may support advanced 3D graphics capabilities, in addition to having its own specialized processor and memory. Computer 110 may also include a digitizer 185 to allow a user to provide input using a stylus input device 186. In addition to the monitor, computers may also include other peripheral output devices such as speakers 189 and printer 188, which may be connected through an output peripheral interface 187.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 182 as residing on memory device 181. It will be appreciated that the network connections shown are exemplary and other means of establishing a communications link between the computers may be used.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Illustrative Embodiments

One or more aspects of the present invention may be used in a software input control in which the user defines a scope, or range, of items to be affected by a subsequent computer operation. Examples include defining a scope of software features to be installed, or a scope of storage locations to be searched. These are but two examples provided for illustrative purposes, and are not intended to limit the scope of the invention.

Figure 4:
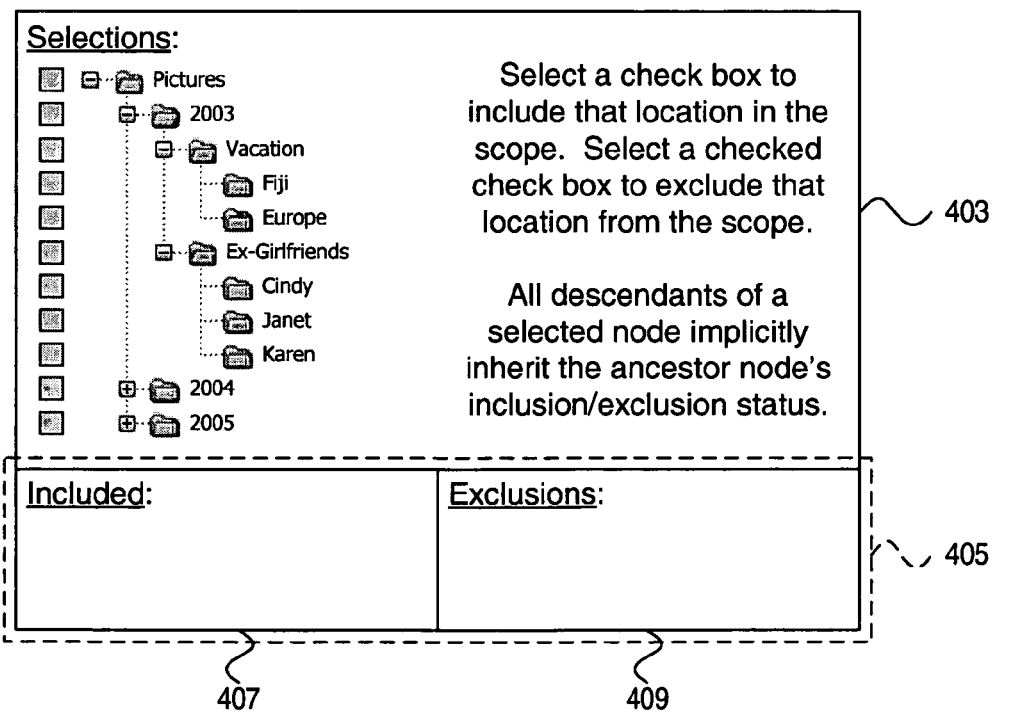
FIG. 4 illustrates a scope input control according to one or more illustrative aspects of the invention.

According to an illustrative aspect of the invention, with reference to FIG. 4, a scope selection control 401 may, in addition to providing a hierarchical selection tree 403, include a basket 405 identifying explicitly included items 407 and explicitly excluded items 409. The scope selection control 401 allows users to quickly visually see that which is included in and excluded from a scope by inspecting the basket. The control 401 also provides the user detailed control at each folder level to specify what is included or excluded in the scope through interaction with the tree 403. According to various aspects of the invention, further described below, the scope selection control 401 may use different visual indications to show the different states of inclusion in a resultant scope. By keeping the basket 405 synchronized to the tree 403, the scope selection control 401 allows a user to quickly switch between hierarchy tree and exclusion basket modes of scope inspection, providing a significant optimization of existing controls for scope creation and modification.

Figure 5:
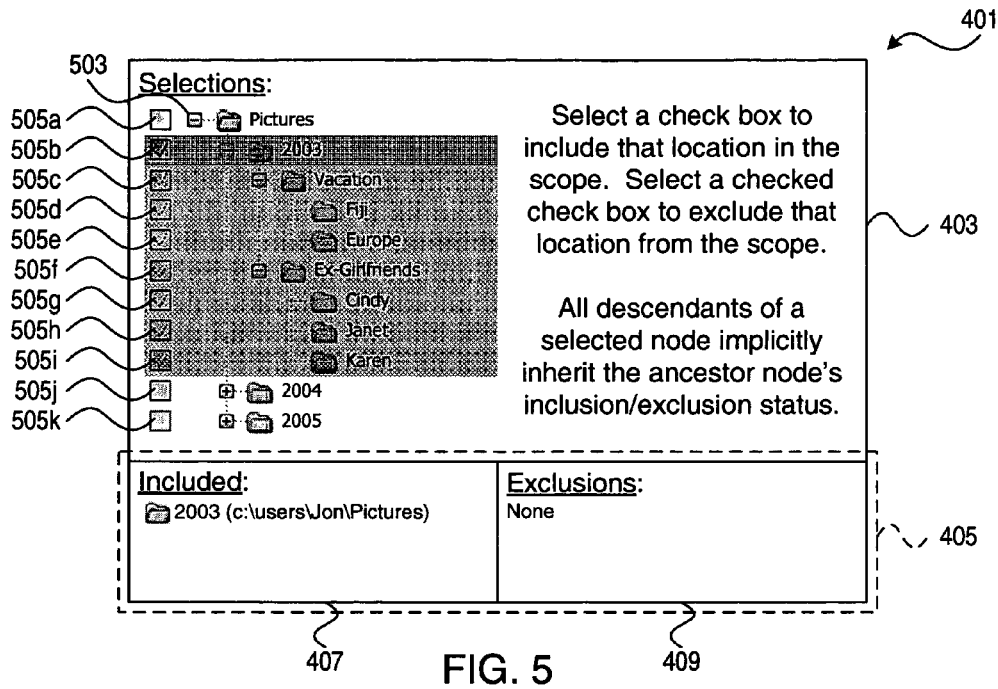
FIG. 5 illustrates a scope input control according to one or more illustrative aspects of the invention.

The operation of scope selection control 401 will now be described with further reference to FIG. 5. The scope may be defined as the resultant set of items selected for inclusion by the user, explicitly or implicitly, via scope selection control 401, minus items explicitly or implicitly selected for exclusion by the user. Explicit selection refers to the user affirmatively selecting a specific item for inclusion or exclusion. Implicit selection refers to descendants of an affirmatively selected item inheriting the inclusion/exclusion status of the explicitly selected ancestor. An item is said to be unselected when the user has neither explicitly nor implicitly selected the item for inclusion or exclusion.

The hierarchical selection tree 403 may include an expand/collapse widget 503 next to each folder having at least one subfolder, as is known in the art. Clicking on or otherwise selecting an expand/collapse widget 503 expands or collapses the corresponding node of the tree. Clicking on or otherwise selecting any other location of a row may toggle selection of that location from the current scope, as described herein. Double clicking on a row may both select the node for inclusion/exclusion and may expand its children by one or more levels. The user may also select a checkbox 505a-505k corresponding to the selected item to toggle the status of the item.

When a user explicitly selects a row for inclusion the scope selection control 401 may indicate the selection in the hierarchy by presenting a first inclusion indicator indicating the item is explicitly included, for example, by drawing or rendering an indicator or graphic on the display screen. For example, in FIG. 5, a user might be defining a scope of search locations to search for a sought after digital photo. Checkbox 505b indicates the user has explicitly selected '2003,' referring to photos taken during the year 2003. Checkbox 505b is checked, and the corresponding row may be highlighted. All files and folders contained within the checked folder are thus presently included in the scope. If the explicitly selected folder contains subfolders, the control 401 may automatically expand the subfolders one or more levels for display to the user.

Explicitly selecting '2003' also results in the implicit selection of all children and descendants of '2003.' Implicitly selection for inclusion may be represented by presenting a second inclusion indicator indicating an item is implicitly included. For example, in FIG. 5, checkboxes 505c-505i corresponding to all descendants of '2003' are presented to include a faded check mark, and each corresponding row may be presented with faded highlighting.

When the user explicitly selects an item, the item may also be added to the basket 405 in the appropriate location, i.e., either included items 407 (inclusions) or excluded items 409 (exclusions). The control preferably may maintain a 1-to-1 ratio between explicitly selected items and entries in the basket. For example, in FIG. 5 the user has explicitly selected the folder '2003' for inclusion in the scope. The control 401, in addition to marking the folder '2003' as explicitly selected in the hierarchy 403, also lists the explicitly selected item in inclusions 407. Because the user has not yet selected any other location for inclusion or exclusion, there are presently no other entries in basket 405 in FIG. 5.

According to an aspect of the invention, a folder may be considered implicitly selected even when the user originally explicitly selected the folder for either inclusion or exclusion, under certain circumstances. For example, assume a user first explicitly selects the folder Vacation. The Vacation folder becomes explicitly selected, and the Fiji and Europe subfolders are implicitly selected. Assume the user subsequently explicitly selects the 2003 folder. The 2003 folder is marked as explicitly selected, and all subfolders, including the Vacation subfolder, are marked as implicitly selected. That is, any time a user explicitly selects an item, all sub items may be marked as implicitly selected, regardless of their previous selection state. However, according to an aspect of the invention, the fact that the user previously explicitly selected an item may be stored for future use. For example, suppose the user later de-selects the 2003 folder, realizing the 2003 folder was selected by accident in the first place. Each of the sub items of the 2003 folder may revert to their previous states, and thus the Vacation folder returns to an explicitly selected state. Once the user is done editing the scope and desires to save the scope for future use, the scope may be saved including each selection, or the scope may be saved without information regarding selections that are irrelevant to the final saved scope. For example, in the above example, the fact that the user first selected the Vacation folder may be discarded when the scope is saved, because the previous selection of the Vacation folder may be irrelevant to the final saved scope.

Figure 6:
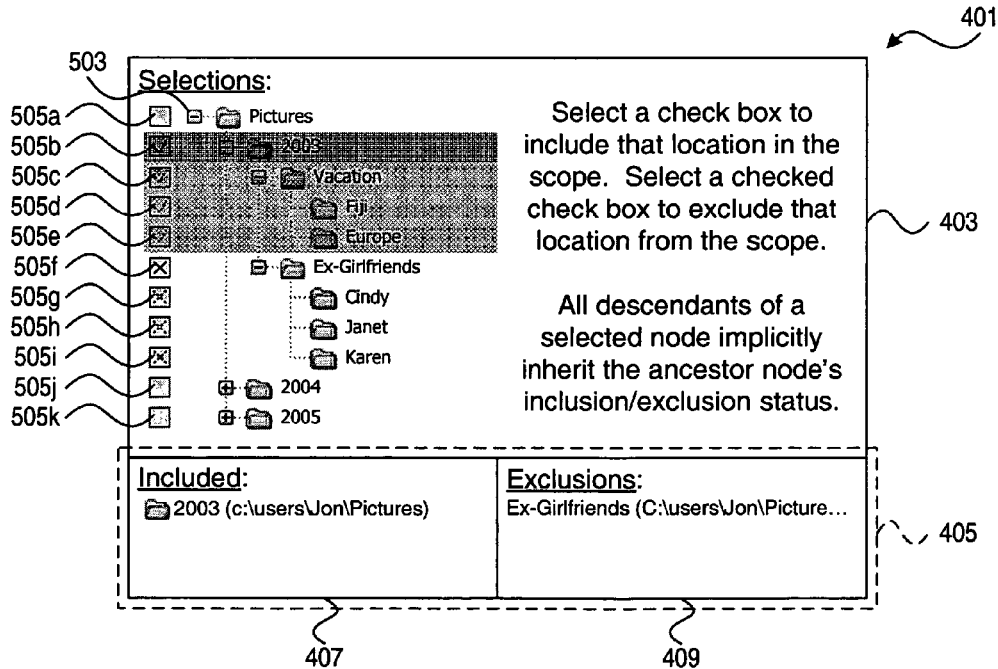
FIG. 6 illustrates a scope input control according to one or more illustrative aspects of the invention.

With further reference to FIG. 6, when a folder is selected for exclusion by a user, that folder and all descendants are removed from the scope. A user may select a folder for exclusion by explicitly selecting that folder after it has been implicitly selected for inclusion, i.e., the user reselects the folder. When a user explicitly selects a row for exclusion the scope selection control 401 may indicate the selection in the hierarchy by presenting a first exclusion indicator indicating the item is explicitly excluded. For example, in FIG. 6, checkbox 505f indicates the user has explicitly excluded the 'Ex-Girlfriends' folder from the scope, e.g., if the user does not want to include photos of ex-girlfriends in the search results. Checkbox 505f is marked with a solid X, and the highlighting on the corresponding row is removed. All files and folders contained within the explicitly excluded folder are thus excluded from the scope. If the explicitly excluded folder contains subfolders, the control 401 may automatically collapse the subfolders, thus only displaying the explicitly excluded folder to the user (without descendants). If the user subsequently expands the widget corresponding to an explicitly excluded folder, the descendants may be displayed with the second exclusion indicator, illustrating implicit exclusion.

Explicitly selecting '2003' for exclusion also results in the implicit exclusion of all children and descendants of '2003' from the scope. Implicit selection for exclusion may be represented by presenting a second exclusion indicator indicating an item is implicitly excluded. For example, in FIG. 6, checkboxes 505g-505i corresponding to all descendants of 'Ex-Girlfriends' are presented including a faded X, and the highlighting on each corresponding row may be removed.

When the user explicitly excludes an item, the item may be added to exclusions 409 of basket 405, visually depicting each explicit exclusion as a property of an explicitly included item (each exclusion also may optionally be stored as a property of an inclusion). For example, in FIG. 6 the user has explicitly excluded the folder 'Ex-Girlfriends' for exclusion from the scope. The control 401, in addition to marking the folder 'Ex-Girlfriends' as explicitly excluded in the hierarchy 403, may list the explicitly excluded item in exclusions list 409 corresponding to explicitly included folder 2003 in inclusions 407.

If a user explicitly selects an explicitly included item, the control 401 may interpret the explicit reselection of the item to indicate the user changed his or her mind regarding that item's inclusion in the scope. However, instead of explicitly excluding the reselected item, the control 401 may simply remove the explicit inclusion status from the reselected item as well as the implicit inclusion status of any descendants, without marking the reselected item or any of its descendants as either explicitly or implicitly excluded. The items revert to the unselected state. Correspondingly, the item is removed from basket 405, the check box corresponding to the item in tree 403 may return to its initial blank state, and any highlighting may be removed. Thus, according to an illustrative aspect of the invention, only a previously implicitly included item can be explicitly excluded from the scope.

Figure 7:
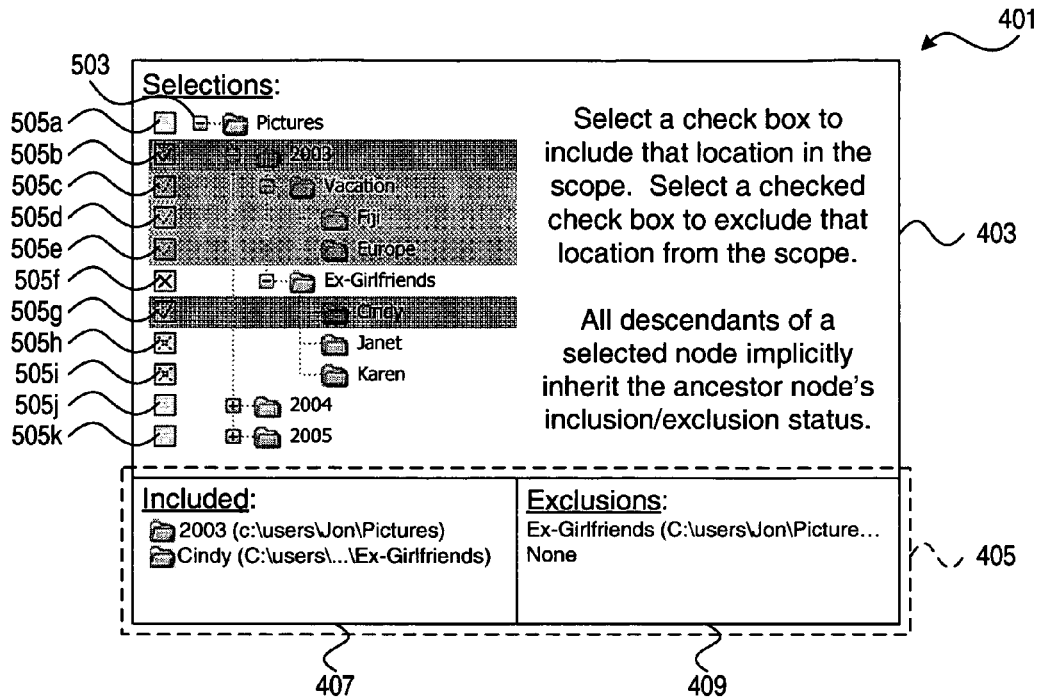
FIG. 7 illustrates a scope input control according to one or more illustrative aspects of the invention.

With further reference to FIG. 7, a user may explicitly include an item from a previously implicitly excluded location. In FIG. 7, the user has decided to include the folder 'Cindy' in the scope, e.g., because the user is still friends with his ex-girlfriend Cindy, but he still does not want to include photos of his other ex-girlfriends in the scope. Upon explicitly selecting the folder 'Cindy' for inclusion, the scope selection control 401 presents first inclusion indicator in checkbox 505g and highlights the corresponding row. The implicit exclusion status of the folders Ex-Girlfriends, Janet, and Karen remain unchanged, because those folders are not descendents of Cindy, but rather are ancestor and peers, respectively. With the explicit inclusion of the folder Cindy, the scope selection control 401 adds a corresponding item to basket 405 in inclusions 407.

In addition to interacting with tree 403, a user may similarly interact with basket 405 to view or modify the scope. The basket preferably displays an item name, location, and icon for each explicitly selected item (although different information may be displayed as desired). The path may be truncated if the physical display size of the basket precludes displaying the entire path for an item, e.g., with ' . . . ' as displayed in FIG. 6 (alpha blending may alternatively be used). Alternatively, the truncation may occur in the middle of the path, illustrated by the ellipses in the middle of the path in FIG. 7. Control 401 may determine what portion of a path to truncate according to any desired algorithm. In one illustrative embodiment, control 401 may determine truncation according to the following priority: show the immediate parent first, show the root (e.g., C:\, D:\, etc.) second, and finally fill in the path with the parent's sequential ancestors until the full path is displayed or until the allotted space is full.

Figure 8:
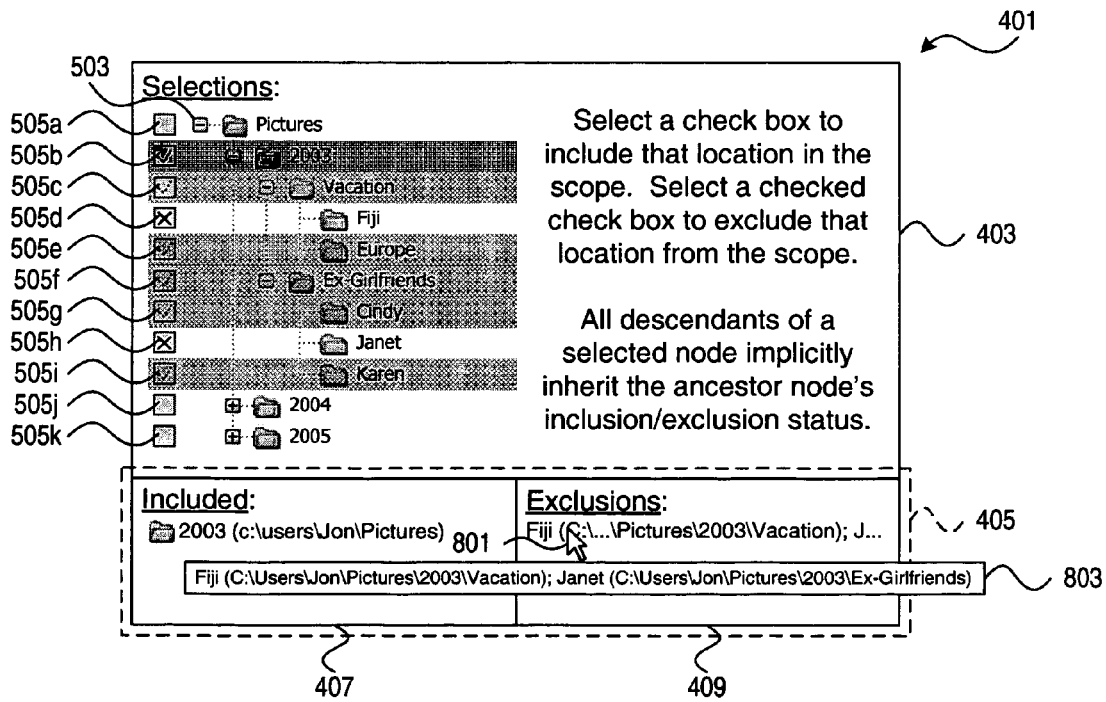
FIG. 8 illustrates a scope input control according to one or more illustrative aspects of the invention.

Selection of a folder in basket 405, e.g., may result in the tree 403 automatically expanding and/or scrolling to display the selected folder, if not already visible in the current view of the tree 403. The tree may also automatically expand the selected folder to display any subfolders of the selected folder. Explicit exclusions may be defined as multi-value properties (MVP) of explicitly included items, where multiple exclusions corresponding to the same explicitly included item result not in an additional row in the basket, but rather in another value added to the exclusions corresponding to the explicitly included item. For example, the view in FIG. 8 results from the user explicitly including the folder '2003', then explicitly excluding the folder 'Fiji,' and finally explicitly excluding the folder 'Janet.' As the user hovers the mouse pointer 801 over the exclusions from '2003' in basket 405 the control 401 may display the fully qualified MVP 803 so the user can inspect the exclusions. As with inclusions, when a user selects an exclusion from basket 405 the control 401 may automatically navigate tree 403 to the selected item.

When the user completes his or her definition or modification of a scope, the user may save the scope for future use, e.g., to storage medium 141, 152, 156, or the like. Saving scopes may be useful when the user repeatedly performs searches over the same scope, with varying match criteria. When a scope is saved, it may be saved as an ordered list of explicit inclusions, with each entry in the list of explicit exclusions having zero or more associated explicit exclusions as an MVP. Thus, the list may store all explicit selections by the user. However, an item might not be included in the list when a user first explicitly selects the item and then subsequently explicitly deselects that same item (for example, realizing it was selected by accident in the first place). In this manner, the proper scope can be recreated based on the ordered list, and any new folder, which is a descendant of an explicitly included or excluded item, added between uses of the scope will be properly taken into account when the scope is reused.

For example, according to an illustrative aspect of the invention a scope may be stored as an eXtensible Markup Language (XML) file. The below XML illustrates a scope identifying explicit inclusions and explicit exclusions, wherein each exclusion is stored as a property of an inclusion, and wherein order is inherently maintained by the order in which data is stored in the XML file:

```xml
<scope>
    <include path="c:\">
        <exclude path="c:\foo">
            <include path="c:\foo\alpha"/>
            <include path="c:\foo\beta"/>
        </exclude>
        <exclude path="c:\too"/>
    </include>
    <include path="d:\"/>
</scope>
```

Figure 9:
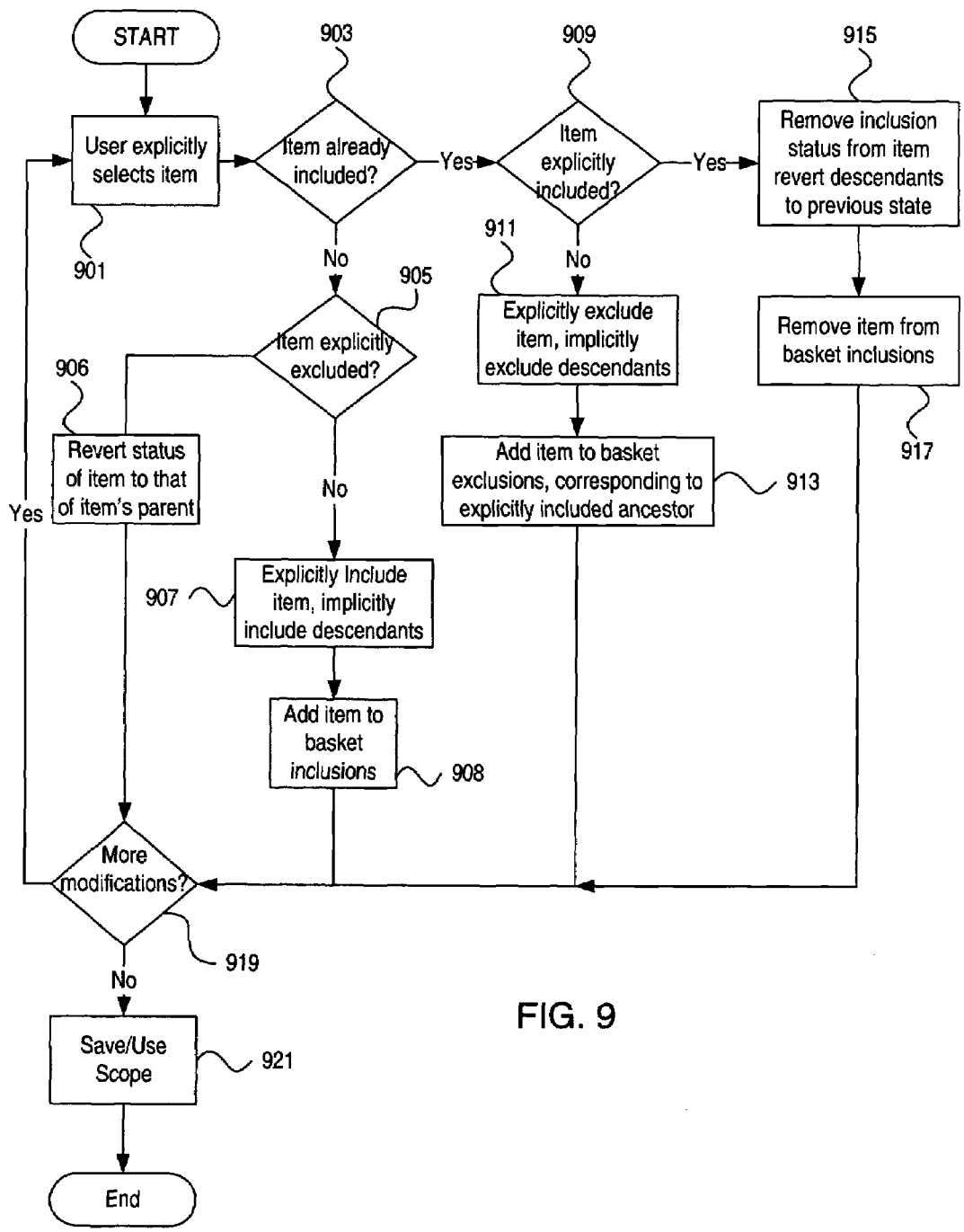
FIG. 9 illustrates a method for specifying a scope according to one or more illustrative aspects of the invention.

FIG. 9 illustrates a method for generating a scope using the scope selection control 401 described above. In step 901, a user explicitly selects an item in tree 403. In step 903 the scope selection control 401 determines whether the explicitly selected item is already set for inclusion in the scope. If so, the method proceeds to step 909. If not, the scope selection control 401 in step 905 determines whether the explicitly selected item is currently set as explicitly excluded from the scope. If so, then in step 906 the scope selection control reverts that status of the explicitly selected item to the status of the parent of the explicitly selected item. If in step 905 the explicitly selected item is not currently explicitly excluded (meaning the item is either implicitly excluded or is selected), then the scope selection control in step 907 explicitly includes the explicitly selected item in the scope, and implicitly includes in the scope all descendants of the explicitly selected item. Next, in step 908, the scope selection control 401 adds the explicitly selected item to inclusions 407 in basket 405.

In step 909 the scope selection control 401 determines whether the previously included item is previously explicitly included or previously implicitly included. If the item was previously implicitly included, then in step 911 the scope selection control 401 explicitly excludes the explicitly selected item, and implicitly excludes all descendants of the explicitly selected item. Next in step 913, the scope selection control 401 adds the explicitly selected item to exclusions 409 in basket 405, corresponding to the nearest explicitly included ancestor of the explicitly selected item.

If in step 909 the explicitly selected item was previously explicitly included, then in step 915 the scope selection control 401 removes the inclusion status for the explicitly selected item and reverts all descendants of the explicitly selected item to their previous state. In step 917 the scope selection control removes the explicitly selected item from inclusions 407, along with any corresponding exclusions 409. Those of skill in the art will appreciate that behavior when an item is unselected may vary. For example, an explicitly included or excluded item might not revert to the unselected state when an ancestor is unselected.

After any of steps 906, 908, 913, or 917, in step 919 the scope selection control determines whether any more modifications are desired. This determination may be implicit, in that the user does not specifically request to make more modifications, but instead simply continues to step 901 to make another modification or, on the other hand, the user selects a 'Save' or 'Search' button in step 921 to indicate to the computer 110 that the user has completed defining the scope, and the computer 110 may use the scope for whatever purpose the user defined the scope. The scope may be said to be the resultant ordered list of explicitly included items, with corresponding explicit exclusions, defined by the basket.

It will be understood by one of ordinary skill in the art that one or more steps may be optional, and steps may be rearranged to produce similar results. In addition, where the above description indicates that the scope selection control 401 performs some action or makes some decision, the scope selection control 401 may be operating in accordance with or under the control of control logic, such as software or hardware instructions, stored on computing device 100 and executed by processor 120.

Those of skill in the art will appreciate that modifications may be made to scope selection control 401 to achieve similar results. The present invention includes any novel feature or combination of features disclosed herein either explicitly or any generalization thereof. While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method of specifying a scope regarding data items on a computer system, comprising steps of:
   (a) displaying on a graphical user interface (GUI) a control comprising a plurality of hierarchically arranged items, wherein each item of the plurality of hierarchically arranged items can be explicitly selected by a user for inclusion and exclusion from the scope;
   (b) displaying, separately from the plurality of hierarchically arranged items, a first list of selectable items explicitly included in the scope and a second list of selectable items explicitly excluded from the scope by the user, wherein each selectable item in the second list corresponds to a selectable item in the first list, and wherein when the user selects one of the selectable items within the first list of selectable items or the second list of selectable items, automatically navigating the plurality of hierarchically arranged items to display an item within the plurality of hierarchically arranged items that corresponds with the user-selected selectable item within the first list of selectable items or the second list of selectable items; and
   (c) when the user explicitly selects a specific item, changing a state of the specific item from a previous state to a new state; and
      (i) in accordance with a user selection to exclude the specific item from the scope, explicitly excluding the specific item and automatically collapsing each descendant of the specific item such that only the explicitly excluded specific item is displayed to the user;
      (ii) changing a state of each descendant of the specific item to a new implicit state based on the new state of the specific item, wherein, when the user explicitly selects the specific item for exclusion, the new implicit state of a descendent comprises an implicitly excluded state that matches the new state of the specific item and can be subsequently changed via a user explicit selection of the descendant, or portion associated therewith, while the specific item maintains an explicitly excluded state after the subsequent change of the descendant via the user explicit selection, as indicated by an exclusion indicator that identifies the specific item as explicitly excluded.

2. The method of claim 1, wherein a state of each item of the plurality of hierarchically arranged items may indicate any one of an unselected state, an explicitly included state, an implicitly included state, an explicitly excluded state, and an implicitly excluded state.

3. The method of claim 2, wherein when the previous state of the specific item is unselected or implicitly excluded, then the new state of the specific item becomes explicitly included, and the new state of each descendant of the specific item becomes implicitly included.

4. The method of claim 3, further comprising presenting a first inclusion indicator corresponding to the specific item, the first inclusion indicator indicating the specific item is explicitly included.

5. The method of claim 4, further comprising presenting a second inclusion indicator corresponding to each descendant of the specific item, the second inclusion indicator indicating that each descendant of the specific item is implicitly included.

6. The method of claim 5, wherein the first inclusion indicator is more prominent than the second inclusion indicator.

7. The method of claim 2, further comprising presenting a first exclusion indicator corresponding to the specific item, the first exclusion indicator indicating the specific item is explicitly excluded.

8. The method of claim 7, further comprising presenting a second exclusion indicator corresponding to each descendant of the specific item, the second exclusion indicator indicating that each descendant of the specific item is implicitly excluded.

9. The method of claim 8, wherein the first exclusion indicator is more prominent than the second exclusion indicator.

10. The method of claim 2, wherein when the previous state of the specific item is explicitly excluded or explicitly included, then the new state of the specific item becomes an implicit state corresponding to a state of a nearest explicitly selected ancestor of the specific item, and the new state of each descendant of the specific item becomes the implicit state corresponding to the state of the nearest explicitly selected ancestor of the specific item.

11. The method of claim 10, further comprising presenting a first indicator corresponding to the specific item and each descendant of the specific item, the first indicator being a same indicator as an indicator of the nearest explicitly selected ancestor of the specific item.

12. The method of claim 2, wherein step (b) comprises:
  (i) displaying an indication of which explicitly included item in the first list to which each explicitly excluded item in the second list corresponds.

13. The method of claim 12, wherein the indication comprises displaying each explicitly excluded item as a property of an explicitly included item to which the explicitly excluded item corresponds.

14. A computer storage medium storing computer executable instructions for performing the method of claim 2.

15. One or more computer storage media storing computer executable instructions that, when executed, perform a method comprising:
  (a) displaying on a graphical user interface (GUI) a control comprising a plurality of hierarchically arranged items, wherein each item of the plurality of hierarchically arranged items can be explicitly selected by a user for inclusion and exclusion from a scope;
  (b) displaying, separately from the plurality of hierarchically arranged items, a first list of selectable items explicitly included in the scope and a second list of selectable items explicitly excluded from the scope by the user, wherein each selectable item in the second list corresponds to a selectable item in the first list, and wherein when the user selects one of the selectable items within the first list of selectable items or the second list of selectable items, automatically navigating the plurality of hierarchically arranged items to display an item within the plurality of hierarchically arranged items that corresponds with the user-selected selectable item within the first list of selectable items or the second list of selectable items; and
  (c) when the user explicitly selects a specific item, changing a state of the specific item from a previous state to a new state; and
    (i) in accordance with a user selection to exclude the specific item from the scope, explicitly excluding the specific item and automatically collapsing each descendant of the specific item such that only the explicitly excluded specific item is displayed to the user;
    (ii) changing a state of each descendant of the specific item to a new implicit state based on the new state of the specific item, wherein, when the user explicitly selects the specific item for exclusion, the new implicit state of a descendent comprises an implicitly excluded state that matches the new state of the specific item and can be subsequently changed via a user explicit selection of the descendant, or portion associated therewith, while the specific item maintains an explicitly excluded state after the subsequent change of the descendant via the user explicit selection, as indicated by an exclusion indicator that identifies the specific item as explicitly excluded.

16. One or more tangible computer readable storage media comprising computer executable instructions which, when executed, cause a computer system to provide on a video output device a graphical user interface control for specifying a user-defined scope, said control exhibiting behavior comprising:
  (a) displaying a plurality of hierarchically arranged items, wherein each item of the plurality of hierarchically arranged items can be explicitly selected by a user for inclusion and exclusion from the scope, and wherein when the user explicitly selects an item for inclusion in or exclusion from the scope, the control implicitly selects all descendants of the explicitly selected item for inclusion in or exclusion from the scope, respectively, wherein each of the implicitly selected descendants can be deselected;
  (b) storing an indication of one or more explicitly selected items such that the one or more explicitly selected items can automatically revert to a previous state at a later time; and
  (c) displaying, separately from the plurality of hierarchically arranged items, a first list of selectable items explicitly included in the scope and a second list of selectable items explicitly excluded from the scope by the user, wherein each selectable item in the second list corresponds to a selectable item in the first list, and wherein when the user selects one of the selectable items within the first list of selectable items or the second list of selectable items, automatically navigating the plurality of hierarchically arranged items to display an item within the plurality of hierarchically arranged items that corresponds with the user-selected selectable item within the first list of selectable items or the second list of selectable items.

17. The computer readable media of claim 16, wherein said control further exhibits behavior comprising:

(d) when the user explicitly selects an unselected or implicitly excluded item:
  (i) changing a state of the explicitly selected unselected or implicitly excluded item to be explicitly included in the scope, and
  (ii) changing a state of each descendant of the explicitly selected unselected or implicitly excluded item to be implicitly included in the scope;
(e) when the user explicitly selects an implicitly included item:
  (i) changing the state of the explicitly selected implicitly included item to be explicitly excluded from the scope, and
  (ii) changing the state of each descendant of the explicitly selected implicitly included item to be implicitly excluded from the scope.

18. The computer readable media of claim 17, wherein said control further exhibits behavior comprising:
(f) when the user explicitly selects an explicitly included or explicitly excluded item:
  (i) changing the state of the explicitly selected explicitly included or explicitly excluded item to be an implicit state corresponding to a state of a nearest explicitly selected ancestor of the explicitly selected explicitly included or explicitly excluded item, and
  (ii) changing the state of each descendant of the explicitly selected explicitly included or explicitly excluded item to be the implicit state corresponding to the state of the nearest explicitly selected ancestor the explicitly selected explicitly included or explicitly excluded item; and
(g) presenting a first inclusion indicator corresponding to each displayed explicitly included item, presenting a second inclusion indicator, less prominently than each first inclusion indicator, corresponding to each displayed implicitly included item, and presenting an exclusion indicator corresponding to each displayed explicitly excluded item.

* * * * *

UNITED STATES PATENT AND TRADEMARK OFFICE
CERTIFICATE OF CORRECTION

PATENT NO. : 7,644,374 B2
APPLICATION NO. : 11/105479
DATED : January 5, 2010
INVENTOR(S) : Wong et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 577 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,644,374 B2 |
| APPLICATION NO. | : 11/105479 |
| DATED | : January 5, 2010 |
| INVENTOR(S) | : Lyon King-Fook Wong et al. |

It is certified that error appears in the above-identified patent and that said Letters Patent is hereby corrected as shown below:

In column 16, line 9, in Claim 18, after "ancestor" insert -- of --.

Signed and Sealed this
Fifteenth Day of February, 2011

David J. Kappos
*Director of the United States Patent and Trademark Office*